United States Patent [19]
Peterson, Jr. et al.

[11] Patent Number: 5,203,440
[45] Date of Patent: Apr. 20, 1993

[54] INTERLOCK CIRCUIT FOR A VEHICLE WITH AN OPTICAL SECOND DRIVE

[75] Inventors: Rudolph A. Peterson, Jr.; James J. Cinnamon, both of Horicon, Wis.

[73] Assignee: Deere & Company, Moline, Ill.

[21] Appl. No.: 903,420

[22] Filed: Jun. 24, 1992

[51] Int. Cl.[5] .................... B60K 41/28; B60K 28/00
[52] U.S. Cl. .................... 192/0.094; 180/273; 307/10.6
[58] Field of Search ............. 192/0.094, 0.09, 0.058, 192/0.062, 84 R; 180/273; 307/10.6

[56] References Cited

U.S. PATENT DOCUMENTS

| | | | |
|---|---|---|---|
| 3,838,748 | 10/1974 | Gray et al. | 180/273 |
| 3,999,643 | 12/1976 | Jones | 192/0.09 X |
| 4,317,500 | 3/1982 | Bening | 180/273 |
| 4,509,614 | 4/1985 | Bando et al. | 180/273 |
| 4,651,018 | 3/1987 | Peterson | 180/273 X |
| 4,974,711 | 12/1990 | Peterson, Jr. et al. | 192/12 D |

Primary Examiner—Rodney H. Bonck

[57] ABSTRACT

An interlock circuit is provided for a vehicle having a first PTO shaft and an optional second PTO shaft. When the optional PTO is installed, a standard seat switch utilized with the base interlock circuit is connected to an additional relay to put the interlock into a potential defeat mode as soon as the operator leaves the seat, provided the vehicle parking brake is engaged and a mechanical selector lever is in a position wherein the optional PTO only is selected. Other interlock functions remain unaffected whether or not the optional PTO is installed.

12 Claims, 1 Drawing Sheet

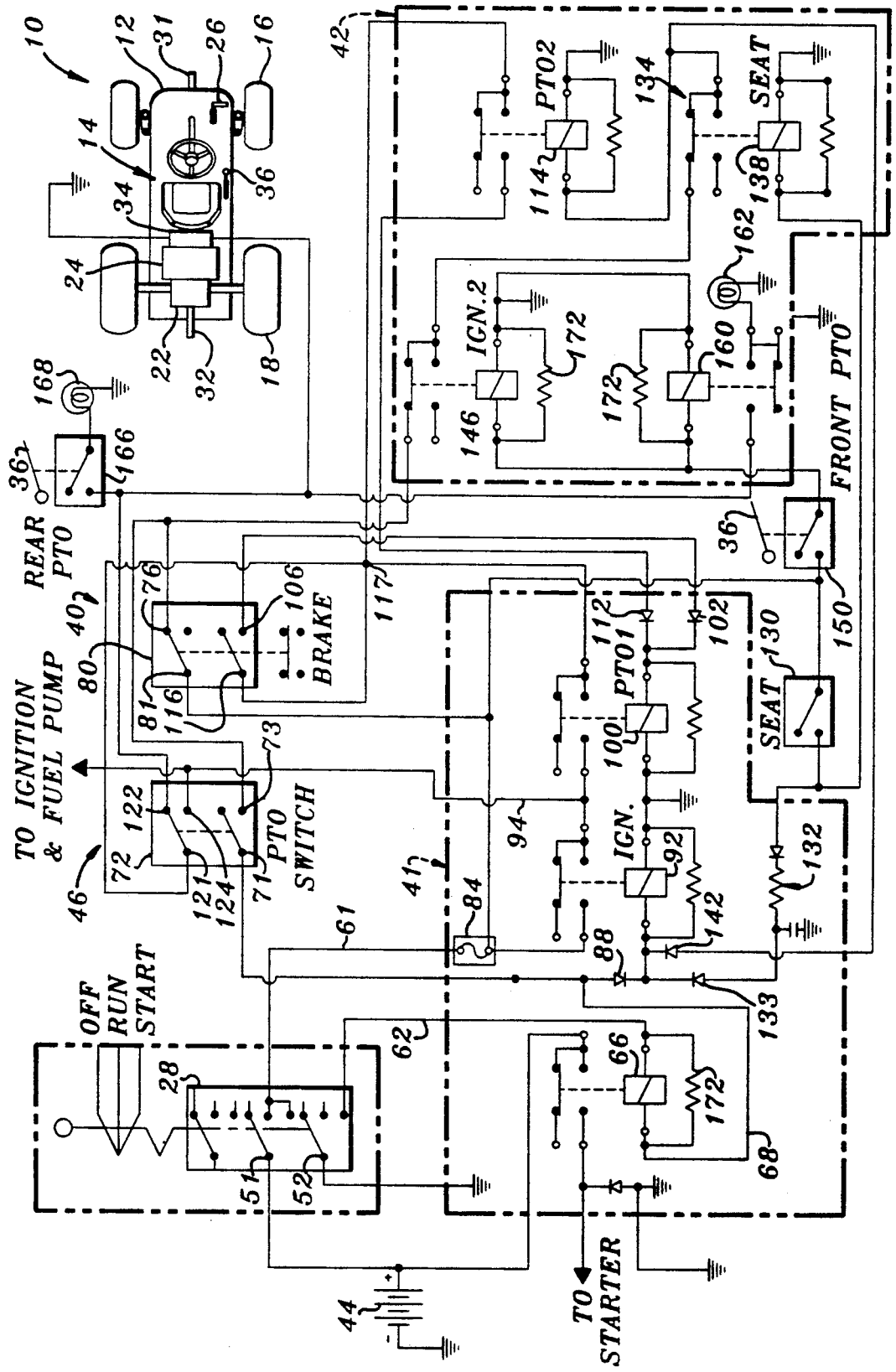

INTERLOCK CIRCUIT FOR A VEHICLE WITH AN OPTICAL SECOND DRIVE

BACKGROUND OF THE INVENTION

The present invention relates generally to vehicles such as lawn and garden tractors and more specifically to an interlock system with an operator presence detection switch, wherein a limited portion of the drive system is operable under certain conditions when the operator is away from the vehicle seat.

Lawn and garden tractors and similar vehicles typically include components driven from a power takeoff (PTO) shaft. Many employ a seat switch to sense the presence of an operator and to automatically kill the engine, when the PTO is engaged or under certain other conditions, if the operator leaves his seat. Other condition responsive devices are usually included in the vehicle for such functions as preventing starting or starter cranking if a transmission or PTO is engaged or if a brake is not engaged. An interlock often is provided for permitting PTO engagement only after a PTO switch is operated following a power up, regardless of the initial PTO switch position on power up.

One problem with use of interlock circuits has been the accommodation of optional features on some models of machines without a substantial redesign or increase in cost of the basic circuitry and without interference with any of the desired interlock operations. For example, some vehicles are offered with both a front and a rear PTO while others have only one PTO. The vehicles offered with two PTO shafts often require that one PTO be operable when the vehicle seat is unoccupied; the single PTO vehicles usually prevent PTO operation in the absence of an operator at the seat. Providing desired interlock function operations for both the base model vehicle with one PTO and the vehicle with the optional second PTO has heretofore required completely different interlock circuits, a special and more expensive seat switch, or other costly modifications to the basic interlock circuitry.

BRIEF SUMMARY OF THE INVENTION

It is therefore an object of the present invention to provide an improved interlock circuit for a vehicle. It is another object to provide such an interlock which overcomes the aforementioned problems.

It is yet another object of the present invention to provide an improved interlock circuit for a base vehicle which easily and relatively inexpensively accommodates an optional feature such as an added PTO or similar drive with an interlock function. It is a further object to provide such a circuit which operates with a simple seat switch, with or without the optional drive feature.

It is a further object of the invention to provide an improved interlock circuit for a vehicle with a first PTO and an optional second PTO. It is yet a further object to provide such a circuit that easily and inexpensively accommodates the optional second PTO and which permits operation of one PTO under certain limited conditions when the operator is away from the seat while prohibiting operation of the other PTO.

A circuit is provided for an optional second PTO shaft wherein a relatively inexpensive standard seat switch is connected to an additional relay in the interlock circuit to put the interlock into a potential defeat mode as soon as the operator leaves the seat, provided the vehicle parking brake is engaged and a mechanical selector lever is in a position wherein the rear PTO only is selected. Other interlock functions remain unaffected whether or not the optional PTO is installed. The drive option with the override feature may be installed easily and quickly without extensive interlock circuit modifications or more complex and expensive seat switches.

These and other objects, features and advantages of the present invention will become apparent to one skilled in the art upon reading the following detailed description in view of the drawings.

BRIEF DESCRIPTION OF THE DRAWINGS

The drawing figure is a schematic of the interlock circuit.

DETAILED DESCRIPTION OF THE DRAWINGS

Referring now to the drawing figure, therein is shown a vehicle such as a lawn and garden tractor 10 having a main frame 12 with an operator station 14 and supported for forward movement over the ground by steerable wheels 16 and drive wheels 18 connected through a transmission 22 to the engine 24. A transmission selector lever 26 having a park position is located at the operator station 14 for selecting a drive ratio and providing a parking brake function. An ignition key switch 28 is also located at the operator station 14.

A first PTO shaft 31 and a second or optional PTO shaft 32 are located at the front and rear, respectively, of the vehicle 10 and are selectively engageable to drive different attachments (not shown). An electric PTO clutch 34 couples the PTO shafts 31 and 32 to the engine 24, and a lever 36 mechanically selects front PTO drive, rear PTO drive, or both front and rear PTO drive.

An interlock circuit 40 includes a first module 41 and a second module 42 connected to each other and to a source of power 44 through the ignition switch 28 and a plurality of selector and/or vehicle condition responsive switches 46. The switch 28 includes a first input 51 connected to the source 44, and a second input 52 connected to ground. The switch 28 has an off position (up as shown), a run position (center position) and a start position (lowermost position). In the on and start positions of the switch 28, the input 51 is connected to a line 61. The input 52 is connected to a line 62 when the switch 28 is in the start position. The line 62 is connected to the solenoid of a start relay 66 so that one terminal of the solenoid is grounded when the switch 28 is moved to the start position. The opposite terminal of the solenoid is connected through a line 68 to the condition responsive switches 46. One contact of the start relay 66 is connected to the source 44 and the opposite terminal is connected to the starter on the vehicle motor. The starter can be activated only if line 68 is connected to the source 44 and the switch 28 is moved to the start position to ground the input 52.

The start relay line 68 is connected to a lower terminal 71 of a main PTO switch 72, and the corresponding output terminal 73 is connected to an output terminal 76 of a parking brake switch 80. A corresponding input terminal 81 is connected through a fuse 84 to the switched power line 61. When the PTO switch 72 is in the off (down) position and the brake switch is in the position shown (the park brake on position), source voltage will be applied to the line 68 when the ignition switch 28 is in either the on or the start positions. In the start position, the relay 66 will be activated to power the starter. For the engine to crank or start, the PTO switch 72 must be in the off position and the brake switch must be in the on position.

The line 68 and the terminal 71 of the PTO switch 72 are also connected through a diode 88 to the solenoid of an ignition relay 92. One terminal of the relay 92 is connected to the switched power line 61 through the fuse 84. The opposite terminal is connected via line 94 to the ignition and fuel pump circuits to enable operation of these components when the relay 92 is activated.

A first PTO relay 100 has a solenoid connected through a diode 102 to an output terminal 106 of the parking brake switch 76. The solenoid of the relay 100 is also connected through a diode 112 to one of the contacts of a second PTO relay 114 located in the second module 42. The opposite contact of the relay 114 is connected through a line 117 to input terminal 116 of the brake switch 80, to one contact of the PTO relay 100 and to a terminal 121 of the PTO switch 72. The PTO relay 100 is activated to provide power to the line 117 when the PTO switch is moved from the off position to the on position with the switch 80 in the brake off position. Once the relay 100 is activated, it remains bootstrapped to the on position through the terminals 116, 106 and diode 102 if the park brake remains disengaged. Once deactivated, the relay 100 can only be reactivated by cycling the main PTO switch 72.

A terminal 122 of the PTO switch 72 is connected to the coil of the PTO clutch 34. With the PTO switch 72 in the on position (up as shown), a closed path is provided between the PTO line 117 and the PTO clutch coil. The PTO switch 72 includes an output terminal 124 connected to the ignition and fuel circuit line 94 so that when the PTO switch 72 is in the off position (down), a closed path is provided between the line 117 and the line 94 to activate the relay 92. Once the relay 92 is deactivated and the power to line 117 is interrupted, power to the clutch 34 can only be restored by first moving the PTO switch 72 to the off position to close the circuit from line 94 to line 117 through terminals 71 and 73 and then disengaging the park brake.

A normally open single pole seat switch 130 is located at the operator station 14 and has one terminal connected to the switched power line 84 and the second terminal connected through an RC time delay circuit 132 and a diode 133 to the solenoid of the ignition relay 92. If the operator leaves the seat and the switch 130 opens for more than about a half second with the main PTO switch 72 in the on position, the power will be interrupted to the ignition relay 92 to stop the engine. However, to put the interlock circuit 40 in a potential defeat mode to allow limited PTO operation with the operator away from the seat, a seat relay override circuit 134 is provided. The circuit 134 permits the main PTO switch to be on without stopping the engine when the operator is off the seat, provided several conditions are met, including the brake switch 80 being in the on condition and the selector lever 36 being positioned such that only the rear PTO is engaged.

The override circuit includes a seat relay 138 having a solenoid connected to the output of the seat switch 130. One contact of the relay 138 is connected through a diode 142 to the solenoid of the ignition relay 92. The opposite contact is connected to the output contacts of a second ignition relay 146. The brake switch terminal 76 is connected to the upper output contact of the relay 146 so that when the relay is inactivated, a closed path exists between the brake switch terminal 76 and contacts of the seat relay 138. The solenoid of the other relay 146 is connected through a normally closed front PTO switch 150 to the switched power line 61 so that when the switch 150 is closed (i.e., the lever 36 is positioned to engage the front PTO), the relay 146 will activate to open the circuit between the terminal 76 and the seat relay 138 so the override circuit 134 is disabled.

With the seat switch 130 open and the front PTO switch 150 off, the seat relay 138 and the second ignition relay 146 will be in the position shown to provide a closed path between the brake switch terminal 76 and the solenoid of the ignition relay 92. With the brake switch 80 on so that the terminal 76 is connected to the switched power line 84, power then can be supplied to the solenoid 92 and thus to the ignition and fuel line 94 so the engine can continue to run without the operator in the seat. If the brake switch 76 is moved from the park position, or if the lever 36 is moved to engage the front PTO and close the PTO switch 150, the override circuit 134 will open to kill the engine and prevent front PTO operation when the operator is not on the seat.

A reverse logic relay 160, which is connected between the switch 150 and a front PTO indicator 162, includes a solenoid which is activated when the lever 36 is in position to engage the front PTO. When closed, the relay 160 activates the indicator 162 to inform the operator that the lever 36 is positioned to engage the front PTO. A rear PTO switch 166 is connected between the terminal 76 of the main PTO switch 80 and a rear PTO indicator 168 and is responsive to the lever 36 being in position to engage the rear PTO with the main PTO switch on to provide a rear PTO on indication. Shunt resistors 172 are connected between each pair of relay solenoid terminals.

In operation, assuming initially the vehicle is parked with the engine off, the operator positions himself on the seat and the seat switch 130 closes. The key switch 28 is turned to the start position to ground the solenoid of the start relay 66. If the transmission lever is positioned in the park position so the brake switch 80 is on and if the PTO switch 72 is off, power is supplied from the switched power line 61 through terminals 81, 76 and 73, 71 to activate the start relay 66 and engage the starter. The ignition relay 92 will also be activated to power the ignition coil and fuel pump so the engine will start. With the main PTO switch 72 off, the first PTO relay 100 will activate as power is provided from the line 94 through the terminals 124, 121 to the line 117, and from the line 117 through the brake switch 80 to the terminal 106 when the brake is released.

With the engine running and the operator on the seat, the PTO selector lever 36 may be positioned to engage either or both of the PTO shafts. The main PTO switch 72 is moved to the on position as shown to activate the PTO coil and engage the PTO clutch 34 to drive the attachment or attachments connected to the selected PTO shaft or shafts. As long as the seat switch 130 is closed, the ignition relay 100 remains activated and the engine remains running. To leave the seat for more than a fraction o a second without killing the engine, the operator engages the park brake and turns off the PTO switch 72 which establishes a current path from the line 61 through thee terminals 81, 76 and 73, 71 to maintain the relay 92 energized after power is interrupted to the relay 02 from the seat switch 130. Once the switch 130 opens, the seat relay 138 deactivates so there is a closed path between the relay 92 and the second ignition relay 146. With the front PTO disengaged by the lever 36, the front PTO switch 150 will be open and the relay 146 deactivated to close the circuit between the terminal 81 of the brake switch 80 and the ignition relay 902 to maintain the relay 92 activated and provide power to the ignition and fuel pump line 94. The second PTO relay 114 is also activated to maintain a closed path from the line 117 through the diode 112 to the solenoid of the PTO relay 100 to bootstrap the relay to the activated position. To engage the rear PTO, the lever 36 is moved to the rear PTO only position and the switch 72 is turned o the on position to activate the coil of the PTO clutch 34. If for any reason the transmission is moved out of the park position or the front PTO is engaged at any time while the operator is away from the seat, the power ro the ignition relay 92 and second PTO relay 114 will be interrupted to immediately kill the engine and disengage the PTO clutch 34.

Having described the preferred embodiment, it will become apparent that various modifications can be made without departing from eh scope of the invention as defined in the accompanying claims.

We claim:

1. In a vehicle having a frame supported for movement over the ground by drive wheels connected through a transmission to an engine, an operator station, a first drive for providing power to a first driven device, an electrically engageable clutch connected between the engine and the first drive, and an operator presence interlock including an operator presence switch providing a first signal when the operator is present at the station and a second signal when the operator is absent from the station, the interlock normally permitting operation of the first drive only when the first signal is present, optional drive and interlock circuit structure comprising:

a second drive connected to the clutch;
a drive selector for selectively engaging the first or second drive; and
means responsive to the selection of the second drive for overriding the operator presence interlock under preselected vehicle conditions when the operator is absent from the station.

2. The invention as set forth in claim 1 wherein the operator presence switch comprises a single pole switch having an on and an off position and operable with or without the optional drive and interlock circuit.

3. The invention as set forth in claim i wherein the operator presence interlock includes an override relay connected to the operator presence switch and responsive to the switch being in a state corresponding to the operator being absent from the station for maintaining engine operation only if the first drive is not selected.

4. The invention as set forth in claim 3 including a second relay connected to the first relay and responsive to the selection of the first drive for preventing operation of the first drive when the operator is away from the station.

5. The invention as set forth in claim 3 including a drive relay connected to the override relay and attractable switch means having first and second states connected to the drive relay for preventing operation of the drives prior to activation of the switch means regardless of the state of said switch means prior to the activation.

6. The invention as set forth in claim 3 wherein the operator presence interlock includes a brake switch responsive to a braked condition of the vehicle, and means connected to the brake switch for preventing overriding of the operator presence interlock when the vehicle is no in the braked condition.

7. In a vehicle having a frame supported for movement over the ground by drive wheels connected through a transmission to an engine, an engageable brake, a source of current, an operator station, a fist selectively operable drive for providing power to a driven device, an electrically engageable clutch connected between the engine and the first drive, a first condition responsive current path connected between the source and the clutch, the fist current path including an operator presence switch having a first condition when the operator is present at the station and a second condition when the operator is absent from the station, means for maintaining the engine in a running condition with the clutch engaged only when the switch is in the fist condition, optional drive and interlock circuit structure comprising:

a second drive connected to the clutch;
means for providing a vehicle braked condition indication dependent upon brake engagement;
a drive selector for selectively engaging the fist or second drive; and
means responsive to the selection of the second drive only for providing a second current path from the source to the engine to maintain the engine in a running condition when the switch is in the second condition, said means responsive including an override relay and mean connecting the override relay to the operator presence switch of establishing the second current path when the operator presence switch is in the second condition only if the vehicle braked condition is indicated.

8. The invention as set forth in claim 7 further comprising a second relay connected to the first mentioned relay for opening the second current path when the first drive is selected.

9. The invention as set forth in claim 7 further comprising a movable clutch switch having an on and an off state, a drive relay, and means connecting the clutch switch to the drive relay for preventing operation of the clutch prior to movement of the clutch switch regardless of the state of the clutch switch on start up of the engine.

10. The invention as set forth in claim 9 including an ignition relay connected to the engine a brake switch and means connecting ignition relay to the presence switch, clutch switch and brake switch for preventing operation of the engine when the presence switch is in the second condition and the clutch switch is in the on state or the vehicle braked condition is not indicated.

11. The invention as set forth in claim 7 wherein the means for maintaining the engine in a running condition includes an ignition relay and means for connecting the ignition relay to the override relay.

12. The invention as set forth in claim 11 further comprising a second ignition relay connected to the first ignition relay, the second ignition relay responsive to the drive selector position for opening the second current path when the first drive is selected.

* * * * *